United States Patent [19]
Wireman

[11] Patent Number: 6,073,506
[45] Date of Patent: Jun. 13, 2000

[54] MULTIPLE COUNTERSHAFT TRANSMISSION

[76] Inventor: Roy L. Wireman, 2214 Silverdale Rd., Augusta, Ga. 30906

[21] Appl. No.: 09/261,029

[22] Filed: Mar. 2, 1999

Related U.S. Application Data

[60] Provisional application No. 60/076,605, Mar. 3, 1998.

[51] Int. Cl.[7] .................................................. F16H 3/095
[52] U.S. Cl. .............................................. 74/331; 74/411
[58] Field of Search ............................. 74/331, 395, 410, 74/411

[56] References Cited

U.S. PATENT DOCUMENTS

| | | | |
|---|---|---|---|
| 1,536,092 | 5/1925 | Guy . | |
| 1,696,740 | 12/1928 | Treschow . | |
| 1,981,236 | 11/1934 | Logue | 74/375 |
| 1,998,891 | 4/1935 | Benson | 74/289 |
| 2,095,794 | 10/1937 | Corbin | 74/305 |
| 3,105,395 | 10/1963 | Perkins | 74/745 |
| 3,237,472 | 3/1966 | Perkins | 74/331 |
| 3,321,988 | 5/1967 | Péras | 74/411 |
| 3,335,616 | 8/1967 | Perkins | 74/331 |
| 3,500,695 | 3/1970 | Keiser | 74/331 |
| 3,648,546 | 3/1972 | McNamara | 74/745 |
| 3,799,002 | 3/1974 | Richards | 74/745 |
| 3,885,446 | 5/1975 | Pengilly | 74/331 |
| 3,924,484 | 12/1975 | Richards | 74/331 |
| 4,152,949 | 5/1979 | Vandervoort | 74/331 |
| 4,226,135 | 10/1980 | Winter | 74/331 |
| 4,375,172 | 3/1983 | Richards et al. | 74/331 |
| 4,586,219 | 5/1986 | Blach | 74/410 |
| 4,640,145 | 2/1987 | Vandervoort | 74/325 |
| 4,709,590 | 12/1987 | Richards | 74/331 |
| 4,754,665 | 7/1988 | Vandervoort | 74/745 |
| 4,807,493 | 2/1989 | Loeffler | 74/745 |
| 5,033,323 | 7/1991 | Janson | 74/375 |
| 5,513,542 | 5/1996 | Bogema et al. | 74/331 |

OTHER PUBLICATIONS

DougNash Equipment & Engineering, Torsion Bar Cluster Shaft, C. 1985, p. 9 of Transmission Manual.

*Primary Examiner*—Sherry L. Estremsky

[57] ABSTRACT

A multiple countershaft transmission including a housing containing at least two countershafts having parallel axes of rotation and being fixed against all movement except rotative with respect to the housing. The housing mounts an input shaft and a mainshaft having a common axis of rotation. The input shaft is free to rotate relative to the mainshaft. The input shaft and mainshaft are fixed against all movement except rotative with respect to the housing. The input shaft mounts an input gear for rotative movement therewith. The mainshaft extends through and mounts a plurality of mainshaft gears which are free to rotate with respect to the mainshaft. The rotational axes of the countershafts are parallel to, equidistant from, and preferably symmetrically spaced about the common input shaft, mainshaft rotational axis. Each mainshaft gear and the input gear meshes with an axially aligned gear on each countershaft. The gear tooth count within each set of axially aligned countershaft gears is identical. The mainshaft is selectively clutchable to the mainshaft gears and the input gear one at a time for rotative movement therewith. An appropriate level of spline lash is used to accommodate inevitable gear timing variations in the assembled transmission due to part manufacturing tolerances without gear tooth mesh interference. The input countershaft gears are coupled to the remainder of the countershaft assemblies by torsionally resilient shafts to ensure substantially balanced distribution of torque on each countershaft as each countershaft assembly drives a clutched mainshaft gear. Adjustment is provided to rotationally index the input countershaft gears to the remainder of the countershaft assemblies. Synchromesh clutches can be employed to facilitate smooth gear engagement.

10 Claims, 1 Drawing Sheet

MULTIPLE COUNTERSHAFT TRANSMISSION

CROSS-REFERENCE TO RELATED APPLICATIONS

This application claims the benefit of Provisional Patent Application Ser. No. 60/076,605, filed Mar. 3, 1998

BACKGROUND OF THE INVENTION

1. Field of the Invention

This invention relates to transmissions and particularly to multiple countershaft transmissions wherein means are provided to ensure a substantially equal distribution of torque on each countershaft.

2. Description of the Related Art Including Information Disclosed Under 37 CFR 1.97 and 1.98

Multiple countershaft transmissions have been used in heavy duty automotive applications as a way to transmit torque by using smaller gears than possible in a single countershaft transmission of equal input torque capacity. Design of and improvements to multiple countershaft transmissions are detailed in the following patents: U.S. Pat. Nos. 3,105,395; 3,237,472; 3,335,616; 3,500,695; 3,648,546; 3,799,002; 3,885,446; 3,924,484; 4,152,949; 4,640,145; 4,709,590; 4,807,493. These designs have common features to ensure substantially equal distribution of torque on each countershaft: (1) The countershaft assemblies require rigid, specific and precise rotational positioning of each countergear as installed on each countershaft. It is a typical requirement to maintain specified countergear tooth centerline rotational positioning accuracy within 0.001 inch to 0.002 inch at the gear tooth pitch line on each countergear with respect to the countershaft they are associated with. This level of precision can be difficult and costly to achieve and maintain in a mass production environment.

One method of manufacturing countershaft gear assemblies to this level of precision involves generating each countergear on an integral, common countershaft. Another method involves cutting a precisely located keyway in the bore of each countergear and pressing the countergears onto keyed countershafts. In some applications, engine torque levels have increased to the extent that this is no longer considered a reliable way to prevent relative motion between the countershaft and the countergears mounted thereon. Consequently, at least one manufacturer welds the installed countershaft gears to the countershaft or to adjacent countershaft gears to prevent this relative motion. Great care must be taken to ensure the welding process does not cause radial runout on each finished countershaft assembly. Such distortion can upset the radial and rotational positioning accuracy of each gear. In addition, if the countergear teeth are heat treated before the welding operation, care must be taken to ensure the welding process does not affect the heat treatment of the gear teeth. These measures add to the complexity and cost of the countershaft assembly manufacturing process.

Neither countershaft assembly manufacturing method allows for replacement of individual gears on the countershaft assembly. If one countershaft gear requires service replacement, the entire countershaft assembly must be replaced, significantly increasing repair costs.

Splined countershaft gear-to-countershaft connections are not used because the precise rotational gear positioning accuracy incumbent to this design is not attainable using such splined connections.

(2) Floating mainshaft driven gears and floating or non-floating mainshaft. Modern, multiple-countershaft transmissions typically have mainshaft driven gears which are free to radially float within narrow limits. The mainshaft may be free to radially float at one or both ends within narrow limits or the mainshaft may be of a non-floating design.

The first discussion will be of radially floating mainshaft driven gears and of a mainshaft that is free to radially float at one or both ends. With such a design, each driven mainshaft gear assumes a radial position to adjust for the inevitable manufacturing tolerances in the assembled transmission. Consequently, the location of the rotational axis of each driven mainshaft gear can independently vary. By design, the floating mainshaft aligns with the driven mainshaft gear as the selected mainshaft gear is mechanically coupled to the mainshaft during gear shifting. Aligning the significantly heavy mainshaft to the selected driven mainshaft gear during gear shifting has the negative effect of increasing gear shifting effort.

In addition, the axes of the selected driven mainshaft gear and the mainshaft are not necessarily parallel. This is because the driven mainshaft gears are constrained to move radially only, such that the rotational axis of each driven mainshaft gear remains substantially parallel to the rotational axis of each countershaft. The mainshaft, however, is allowed to move radially at one or both ends. Either freedom of movement of the mainshaft has the disadvantage of allowing the mainshaft to assume a non-parallel relationship to the selected driven mainshaft gear. This causes relative sliding motion between the mainshaft gear-to-mainshaft coupling elements as these elements rotate. This reduces the mechanical efficiency of the transmission and increases wear on these elements.

In addition, this non-parallel relationship can result in significant contact stress between the selected driven mainshaft gear and the mainshaft members used to limit the axial movement of the selected driven mainshaft gear on the mainshaft. This can become a greater disadvantage when helical gearing is used, since such gearing can generate significant axial thrust forces, thus increasing this contact stress and consequently increasing wear between these surfaces.

In addition, when the mainshaft is free to move radially at one or both ends, the mainshaft can have a nutating motion when the transmission is in neutral (when the mainshaft is not mechanically coupled to a driven mainshaft gear) and the mainshaft is rotating. If the mainshaft rotational speed is significant, undesirable vibration can result from the nutating motion. In addition, the vibration forces can create the disadvantage of further increasing shifting effort during gear changes.

The second discussion will be of radially floating driven mainshaft gears and a non-floating mainshaft. With such a design, each driven mainshaft gear assumes a radial position to adjust for the inevitable manufacturing tolerances in the assembled transmission. Consequently, the location of the rotational axis of each driven mainshaft gear can independently vary from the fixed mainshaft rotational axis. Such an arrangement has the disadvantage of radial sliding contact between the engaged driven mainshaft gear and the driven mainshaft member, reducing the mechanical efficiency of the transmission and increasing wear on these gear engagement surfaces.

In the first and second discussions, the driven mainshaft gears are permitted to radially float; therefore, the driven mainshaft gears do not necessarily engage their mating countershaft gears pitch line-to-pitch line; this can result in reduced mechanical efficiency and increased gear noise.

Since the prior art permits limited radial movement of mainshaft gears with respect to the mainshaft, it is impossible to employ standard synchromesh clutches for the various shifting operations, as such clutches require exact alignment of the various gears and shafts they act on. For this reason, more basic jaw-type clutches are used which allow limited radial displacement of the clutched parts relative to each other. The result of this type of construction is that shifting must be done with much care or with assist from a complex automated gear shifting mechanism in order to prevent grinding and clashing of gear clutch teeth.

U.S. Pat. No. 4,226,135 (1980) to Winter proposed a multiple countershaft transmission design which would allow the mainshaft gears to remain concentric to the mainshaft, consequently allowing the usage of synchromesh clutches. However, Winter's transmission is of a hybrid design, in that input torque is directed through only one countershaft in several of the transmission ratios and through two countershafts in other transmission ratios. In addition, as with other prior art, gear timing must be very precise (in at least some of the transmission ratios) to ensure substantially equal distribution of torque on each countershaft. In addition, Winter's design includes a relatively intricate mechanism to provide limited angular motion between countershaft gears and countershafts.

BRIEF SUMMARY OF THE INVENTION

The invention comprises a transmission having a plurality of countershafts, each having a fixed axis of rotation and arranging same at preferably equally spaced intervals around and equidistant from an axially aligned input shaft and mainshaft. Said input shaft and mainshaft have a common, fixed axis of rotation. Each said countershaft supports a countershaft gear of the same tooth count which meshes with a common input shaft gear or a common mainshaft gear. Said input shaft gear is supported by and rotates with said input shaft. Said mainshaft extends through and supports all mainshaft gears and is selectively clutchable to one thereof at a time for rotative movement therewith. Means are provided to accommodate inevitable manufacturing tolerances in the assembled transmission without tooth mesh interference. Resilient means are provided to ensure substantially balanced distribution of torque on each countershaft.

1. OBJECTS AND ADVANTAGES

Accordingly, several objects and advantages of the invention are:

(1) to provide a multiple countershaft transmission design which significantly reduces the required rotational positioning accuracy of the countershaft gears on their respective countershafts;

(2) to provide a multiple countershaft transmission design which does not require welding of the countershaft gears to their respective countershafts or to each other, thus avoiding gear positioning problems caused by welding-induced distortion and also avoiding potential gear tooth weakening caused by welding heat negatively affecting previous gear tooth heat treatment;

(3) to provide a multiple countershaft transmission design which allows for replacement of individual countershaft gears on the countershaft assemblies;

(4) to provide a multiple countershaft transmission design which permits the usage of splined countershaft gears and countershafts, the gears being producible on modem gear manufacturing machinery without secondary tooth-to-spline timing operations;

(5) to provide a multiple countershaft transmission design which permits the usage of splined countershaft gears and countershafts as noted in (4) above which have a limited amount of angular spline backlash, permitting hand assembly of countershaft gears on their respective countershafts;

(6) to provide a multiple countershaft transmission design which permits the rotational axis of the driven mainshaft gears to remain coaxial with the mainshaft rotational axis, thus reducing shift effort during gear changes;

(7) to provide a multiple countershaft transmission design which permits the rotational axis of the driven mainshaft gears to remain coaxial with the mainshaft rotational axis, as noted in (6) above, thus allowing the usage of synchromesh clutches, (8) to provide a multiple countershaft transmission design which permits the rotational axis of the driven mainshaft gears to remain coaxial with the mainshaft axis, as noted in (6) above, so there is no relative sliding motion between the driven mainshaft gear-to-mainshaft coupling elements as these elements rotate, thus eliminating a source of friction and wear;

(9) to provide a multiple countershaft transmission design which permits the rotational axis of the driven mainshaft gears to remain coaxial with the mainshaft axis, as noted in (6) above, so that there is uniform contact between the driven mainshaft gears and the mainshaft members used to limit the axial movement of the driven mainshaft gears on the mainshaft, thus substantially reducing contact stress;

(10) to provide a multiple countershaft transmission design which permits the rotational axis of the mainshaft to be non-floating, thus eliminating vibration due to mainshaft nutation;

(11) to provide a multiple countershaft transmission design which permits the rotational axis of the mainshaft to be non-floating, thus eliminating vibration due to mainshaft nutation as noted in (10) above, resulting in reduced shifting effort during gear changes;

(12) to provide a multiple countershaft transmission design in which the mainshaft driven gears are supported by the non-floating mainshaft so that the mainshaft driven gears engage their mating countershaft gears pitch line-to-pitch line for increased power transmission efficiency and reduced gear noise,

(13) to provide a multiple countershaft transmission design in which the preceding objects and advantages can be realized while maintaining a substantially balanced distribution of torque on each countershaft.

Further objects and advantages of the invention will become apparent from a consideration of the drawing and ensuing description.

Figure 1:
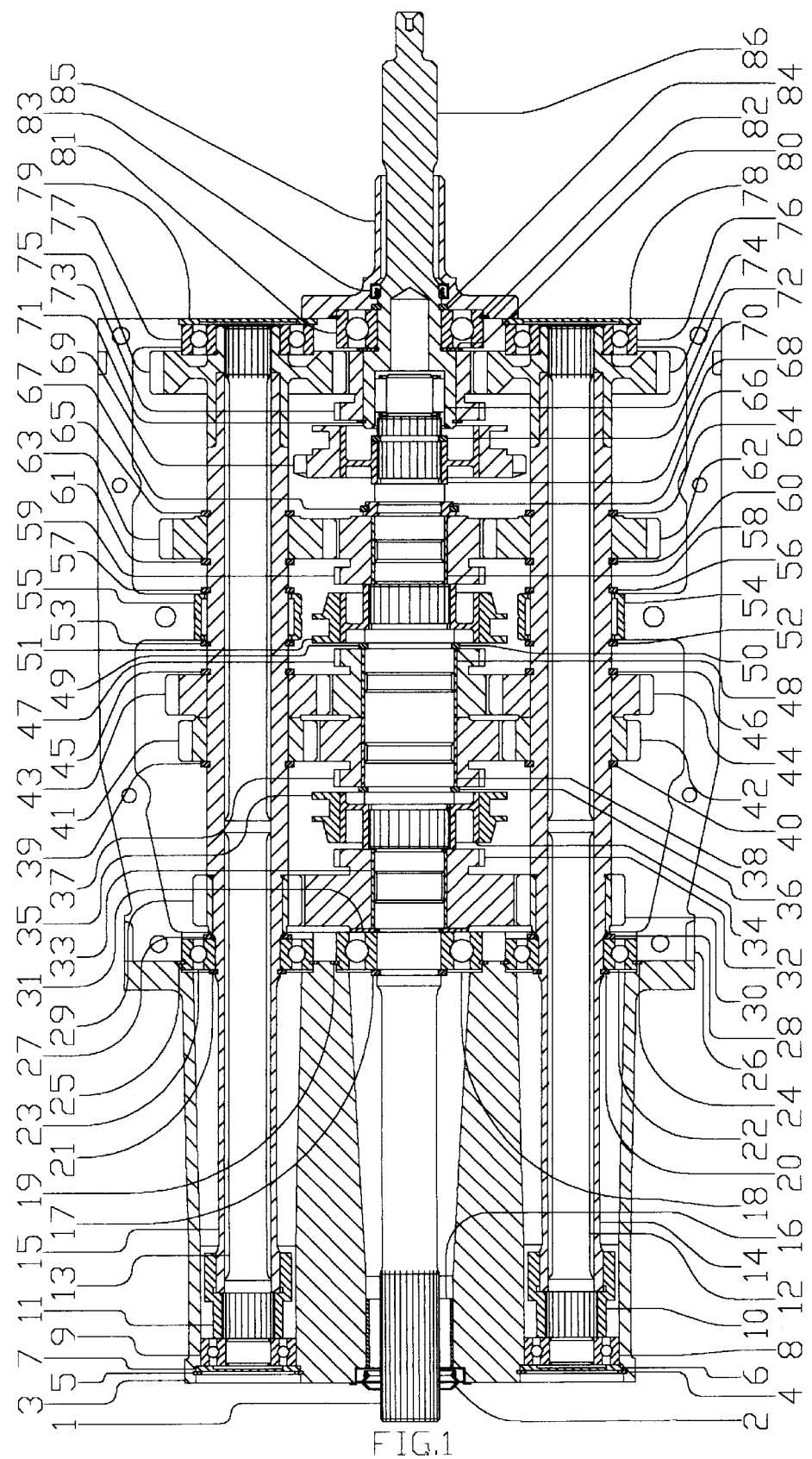
FIG. 1 is a horizontal, full sectional view of the central section of a transmission showing a preferred embodiment of the invention. All numbered items are shown in full profile view or full sectional view. The view represents the lower half of the transmission. However, since the upper and lower halves of the transmission as drawn are exact mirror images of each other, the choice to refer to this view as the lower half view is to establish convention only for the purpose of description.

While the broader aspects of the principles above set forth are applicable to arrangements involving more than two countershafts, the most common commercial arrangements appear at present to embody to a greater extent two countershafts and to a lesser extent, three. Accordingly, the specific embodiment hereinafter described employs only two countershafts and the description will for convenience, but not by way of limitation, be set forth in such terms.

REFERENCE NUMERALS IN DRAWING

1 Mainshaft
2 Mainshaft Seal
3 Extension Housing
4 Rear Retaining Ring, Right Countershaft
5 Rear Retaining Ring, Left Countershaft
6 Rear Plug, Right Countershaft
7 Rear Plug, Left Countershaft
8 Ball Bearing, Right Torsion Bar
9 Ball Bearing, Left Torsion Bar
10 Splined Coupling, Right
11 Splined Coupling, Left
12 Torsion Bar, Right
13 Torsion Bar, Left
14 Countershaft, Right
15 Countershaft, Left
16 Mainshaft Bushing
17 Retaining Ring, Rear Mainshaft Bearing
18 Ball Bearing, Mainshaft
19 Retaining Ring, Mainshaft Bearing Outer Race
20 Retaining Ring, Rear Countershaft Bearing (right)
21 Retaining Ring, Rear Countershaft Bearing (left)
22 Ball Bearing, Countershaft (right)
23 Ball Bearing, Countershaft (left)
24 Retaining Ring, Rear Countershaft Bearing Outer Race (right)
25 Retaining Ring, Rear Countershaft Bearing Outer Race (left)
26 Main Case (lower half)
27 Spacer, First Countershaft Gear-to-Bearing (left)
28 Spacer, First Countershaft Gear-to-Bearing (right)
29 First Countershaft Gear (left)
30 First Countershaft Gear (right)
31 Spacer, First Mainshaft Gear-to-Bearing
32 First Mainshaft Gear
33 First Mainshaft Gear Bushing
34 Hub, First and Second Gear Slider
35 Slider, First and Second Gear
36 Retaining Ring, Second Mainshaft Gear
37 Second Mainshaft Gear
38 Bushing, Second Mainshaft Gear
39 Retaining Ring, Second Countershaft Gear (left)
40 Retaining Ring, Second Countershaft Gear (right)
41 Second Countershaft Gear (left)
42 Second Countershaft Gear (right)
43 Third Countershaft Gear (left)
44 Third Countershaft Gear (right)
45 Retaining Ring, Third Countershaft Gear (left)
46 Retaining Ring, Third Countershaft Gear (right)
47 Third Mainshaft Gear
48 Bushing, Third Mainshaft Gear
49 Retaining Ring, Third Mainshaft Gear
50 Hub, Third and Fourth Gear Slider
51 Slider, Third and Fourth Gear
52 Retaining Ring, Countershaft Roller Bearing (right rear)
53 Retaining Ring, Countershaft Roller Bearing (left rear)
54 Roller Bearing, Countershaft (right)
55 Roller Bearing, Countershaft (left)
56 Retaining Ring, Countershaft Roller Bearing (right front)
57 Retaining Ring, Countershaft Roller Bearing (left front)
58 Bushing, Fourth Mainshaft Gear
59 Fourth Mainshaft Gear
60 Retaining Ring, Fourth Countershaft Gear (right rear)
61 Retaining Ring, Fourth Countershaft Gear (left rear)
62 Fourth Countershaft Gear (right)
63 Fourth Countershaft Gear (left)
64 Retaining Ring, Fourth Countershaft Gear (right front)
65 Retaining Ring, Fourth Countershaft Gear (left front)
66 Split Ring
67 Retaining Ring, Fourth Mainshaft Gear
68 Hub, Reverse and Fifth Gear Slider
69 Slider, Reverse and Fifth Gear
70 Retaining Ring, Reverse and Fifth Gear Slider Hub
71 Retaining Ring, Input Gear
72 Roller Bearing, Input Shaft
73 Input Gear
74 Input Countershaft Gear (right)
75 Input Countershaft Gear (left)
76 Ball Bearing, Input Countergear (right)
77 Ball Bearing, Input Countergear (left)
78 Plug, Front Countershaft (right)
79 Plug, Front Countershaft (left)
80 Spacer, Input Shaft
81 Ball Bearing, Input Shaft
82 Retaining Ring, Input Shaft Bearing (outer race)
83 Seal, Input Shaft
84 Retaining Ring, Input Shaft Ball Bearing
85 Bearing Retainer
86 Input Shaft

DETAILED DESCRIPTION OF THE DRAWING

1. Description—FIG. 1

In the following description certain directional terminology will be used for convenience of reference but it will be understood that such terminology will be for convenience only and has no limiting significance. Thus, the rightward portion of FIG. 1 relates to the "forward" end of the transmission. The leftward portion of FIG. 1 relates to the "rearward" end of the transmission. The top portion of FIG. 1 relates to the "left" side of the transmission. The bottom portion of FIG. 1 relates to the "right" side of the transmission. The terms "inward" and "outward" will refer to directions toward and away from the geometric center of the transmission. All terms mentioned foregoing include all normal derivatives and equivalents of each thereof Referring now to drawing FIG. 1, there is provided a right countershaft roller bearing 54 which supports and is mounted to a right countershaft 14. Bearing 54 is constrained from moving axially relative to shaft 14 by a right rear and a right front countershaft roller bearing retaining ring 52,56 respectively. A right fourth countershaft gear 62, having internal splines, is mounted on external splines on shaft 14. Gear 62 is constrained from moving axially relative to shaft 14 by a right rear and a right front fourth countershaft gear retaining ring 60 and 64, respectively. The forward end of shaft 14 is inserted into a counterbore in the rear face of a right input countershaft gear 74 such that shaft 14 is rotatable relative to gear 74. The length of engagement and the fit between the forward end of shaft 14 and the counterbore in gear 74 is sufficient to keep shaft 14 substantially coaxial with gear 74 at all times. A right input countergear ball bearing 76 supports and is mounted to gear 74. A right third countershaft gear 44 and a right second countershaft gear 42, each having internal splines, are mounted on external splines on shaft 14. Gear 42 and gear 44 are captured between and are constrained from moving axially relative to shaft 14 by a right second countershaft gear retaining ring 40 and a right third countershaft gear retaining ring 46. A right first countershaft gear 30, having internal splines, is mounted on external splines on shaft 14. Immediately to the rear of gear 30 is a right first countershaft gear-to-bearing spacer 28. Immediately to the rear of spacer 28 is a right countershaft ball bearing 22 which supports shaft 14. Mounted on bearing 22 is a right rear countershaft bearing outer race retaining ring 24. Axial movement of gear 30, spacer 28, bearing 22 and ring 24 relative to shaft 14 is constrained in the forward direction by a thrust face on shaft 14 which contacts the front face of gear 30 and in the rearward direction by a right rear countershaft bearing retaining ring 20. All items in this paragraph comprise the "right countershaft assembly".

A left countershaft roller bearing 55 supports and is mounted to a left countershaft 15. Bearing 55 is retained on shaft 15 by a left rear and a left front countershaft roller bearing retaining ring 53,57 respectively. A left fourth countershaft gear 63, having internal splines, is mounted on external splines on shaft 15. Gear 63 is constrained from moving axially relative to shaft 15 by a left rear and a left front fourth countershaft gear retaining ring 61 and 65, respectively. The forward end of shaft 15 is inserted into a counterbore in the rear face of a left input countershaft gear 75, such that shaft 15 is rotatable relative to gear 75. The length of the engagement and the fit between the forward end of shaft 15 and the counterbore in gear 75 is sufficient to keep shaft 15 substantially coaxial with gear 75 at all times. A left input countergear ball bearing 77 supports and is mounted to gear 75. A left third countershaft gear 43 and a left second countershaft gear 41, each having internal splines, are mounted on external splines on shaft 15. Gear 41 and gear 43 are captured between and are constrained from moving axially relative to shaft 15 by a left second countershaft gear retaining ring 39 and a left third countershaft gear retaining ring 45. A left first countershaft gear 29, having internal splines, is mounted on external splines on shaft 15. Immediately to the rear of gear 29 is a left first countershaft gear-to-bearing spacer 27. Immediately to the rear of spacer 27 is a left countergear shaft ball bearing 23 which supports shaft 15. Mounted on bearing 23 is a left rear countershaft bearing outer race retaining ring 25. Axial movement of gear 29, spacer 27, bearing 23 and ring 25 is constrained relative to shaft 15 in the forward direction by a thrust face on shaft 15 which contacts the front face of gear 29 and in the rearward direction by a left rear countershaft bearing retaining ring 21. All items in this paragraph comprise the "left countershaft assembly".

A second mainshaft gear 37 has external, integral clutch teeth in addition to external gear teeth. The bore of gear 37 has a second mainshaft gear bushing 38. The assembly consisting of gear 37 and bushing 38 is rotatably mounted with respect to and supported by a mainshaft 1. A third mainshaft gear 47 has external, integral clutch teeth in addition to external gear teeth. The bore of gear 47 has a third mainshaft gear bushing 48. The assembly consisting of gear 47 and bushing 48 is rotatably mounted with respect to and supported by mainshaft 1. Gear 37, bushing 38 assembly and gear 47, bushing 48 assembly are captured between a second mainshaft gear retaining ring 36 and a third mainshaft gear retaining ring 49 to constrain axial movement of gear 37, bushing 38 assembly and gear 47, bushing 48 assembly relative to mainshaft 1.

A first and second gear slider hub 34, having internal splines, is mounted on external splines on mainshaft 1. A first and second gear slider 35, having internal splines, is slidably mounted on external splines on hub 34. A first mainshaft gear 32 has external, integral clutch teeth in addition to external gear teeth. The bore of gear 32 has a first mainshaft gear bushing 33. The assembly consisting of gear 32 and bushing 33 is rotatably mounted with respect to and supported by mainshaft 1 and is located immediately rearward of hub 34. A first mainshaft gear-to-bearing spacer 31 is located immediately rearward of gear 32, bushing 33 assembly. A mainshaft ball bearing 18 is located immediately rearward of spacer 31. A mainshaft bearing outer race retaining ring 19 is located on the outer race of bearing 18. The axial movement of hub 34, gear 32 and bushing 33 assembly, spacer 31 and bearing 18 relative to mainshaft 1 is constrained in the forward direction by a thrust face on mainshaft 1 immediately forward of hub 34 and in the rearward direction by a rear mainshaft bearing retaining ring 17.

A third and fourth gear slider hub 50, having internal splines, is mounted on external splines on mainshaft 1. A third and fourth gear slider 51, having internal splines, is slidably mounted on external splines on hub 50. A fourth mainshaft gear 59 has external, integral clutch teeth in addition to external gear teeth. The bore of gear 59 has a fourth mainshaft gear bushing 58. The assembly consisting of gear 59 and bushing 58 is rotatably mounted with respect to and supported by mainshaft 1 and is located immediately forward of hub 50. A split ring 66 is located immediately forward of gear 59 and bushing 58 assembly and fits into a groove machined in mainshaft 1. Ring 66 is retained on mainshaft 1 by a fourth mainshaft gear retaining ring 67. Axial movement of hub 50 and gear 59, bushing 58 assembly relative to mainshaft 1 are constrained in the rearward direction by a thrust face on mainshaft 1 and in the forward direction by ring 66 and ring 67 assembly.

A reverse and fifth gear slider hub 68, having internal splines, is mounted on external splines on mainshaft 1. A reverse and fifth gear slider 69, having internal splines, is slidably mounted on external splines on hub 68. Axial movement of hub 68 relative to mainshaft 1 is constrained in the rearward direction by a thrust face on mainshaft 1 and in the forward direction by a reverse and fifth gear slider hub retaining ring 70. All items in this paragraph and the preceding three paragraphs comprise the "mainshaft assembly".

An input gear retaining ring 71 is located rearward on an input shaft 86. An input gear 73 is mounted on shaft 86 immediately forward of ring 71 by means of internal splines on gear 73 and external splines on shaft 86. Gear 73 has external, integral clutch teeth in addition to external gear teeth. An input shaft spacer 80 is mounted on shaft 86 immediately forward of gear 73. An input shaft ball bearing 81 is mounted on shaft 86 immediately forward of spacer 80. An input shaft bearing outer race retaining ring 82 is mounted on the outer race of bearing 81. An input shaft ball bearing retaining ring 84 is located on shaft 86 immediately forward of bearing 81. Axial movement of gear 73, spacer 80, bearing 81 and ring 82 is constrained relative to shaft 86 in the rearward direction by ring 71 and in the forward direction by ring 84. All items in this paragraph comprise the "input shaft assembly".

An input shaft roller bearing 72 is located in a counterbore in the rear face of shaft 86. A bearing journal on the forward end of mainshaft 1 mounts within bearing 72 such that shaft 86 is rotatable relative to mainshaft 1.

Said input shaft and mainshaft assemblies are rotatably mounted in a split main case of which a lower half of main case 26 is shown. Said input shaft and mainshaft assemblies are mounted by means of bores in the front and rear walls of case 26 which support bearings 81 and 18, respectively. The upper and lower halves of case 26 attach by fasteners (not shown). A bearing retainer 85 is attached to the front of case 26 by fasteners (not shown). Axial movement of said input shaft assembly is constrained by ring 82, which is in turn axially constrained in the rearward direction by case 26 and in the forward direction by retainer 85. Counterbores in retainer 85 receive bearing 81 and ring 82. Axial movement of said mainshaft assembly is constrained by ring 19, which is in turn axially constrained in the rearward direction by an extension housing 3 and in the forward direction by case 26. Counterbores in housing 3 receive bearing 18 and ring 19. Housing 3 attaches to case 26 by means of fasteners (not shown).

Slider 35, having internal splines, is slidable along the external splines of hub 34 either forward or rearward from the illustrated position. Said internal splines on slider 35 are configured to mesh with external clutch teeth on gear 32 when slider 35 is moved rearward and to mesh with external clutch teeth on gear 37 when slider 35 is moved forward.

Slider 51, having internal splines, is slidable along the external splines of hub 50 either forward or rearward from the illustrated position. Said internal splines on slider 51 are configured to mesh with external clutch teeth on gear 47 when slider 51 is moved rearward or to mesh with external clutch teeth on gear 59 when slider 51 is moved forward.

Slider 69, having internal splines, is slidable along the external splines of hub 68 either forward or rearward from the illustrated position. Said internal splines on slider 69 are configured to mesh with external clutch teeth on gear 73 when slider 69 is moved forward from the illustrated position.

Sliders 35, 51 and 69 are axially slidable for alternate but only alternate engagement to said gears. Such axial movement is effected by any convenient means well known and used by those practiced in the art. By way of example, shift forks (not shown) acting in the grooves on the outside of sliders 35, 51 and 69 can effect axial movement of said sliders.

Various accepted means, such as synchromesh clutches, are well known and used by those practiced in the art to synchronize the rotational speed of the selected mainshaft gear with the rotational speed of the mainshaft before gear engagement occurs to avoid clashing and grinding of gear clutch teeth. The mainshaft gear clutching means illustrated and described herein will be recognized as one of the most basic used by those practiced in the art, void of any means of speed synchronization; the purpose being to efficiently communicate the unique features of the invention without limiting the scope of the invention as it relates to mainshaft gear speed synchronization and clutching means.

Said right countershaft assembly is rotatably mounted in the right side of case 26 by means of bores in the front and rear walls of case 26, which support bearings 76 and 22, respectively. Bearing 54 is supported by a bore in the inner wall in case 26, which partially encircles bearing 54. Axial movement of said right countershaft assembly is constrained by ring 24, which is in turn axially constrained in the rearward direction by housing 3 and in the forward direction by case 26. Counterbores in housing 3 receive bearing 22 and ring 24. A right front countershaft plug 78 is located in a counterbore in the front of case 26. An external member, such as a master clutch housing (not shown) is joined to the case 26 by fasteners (not shown). Rearward axial movement of gear 74 and bearing 76 is constrained by shaft 14. Rearward axial movement of plug 78 is constrained by case 26. Forward axial movement of gear 74, bearing 76 and plug 78 is constrained by the rear face of said external member.

Shaft 14, being of tubular construction, encircles a right torsion bar 12. The front end of bar 12, having external splines, engages internal splines in gear 74 and is radially supported by gear 74. The bore of shaft 14 supports bar 12 at raised journals located near the middle and near the rear end of bar 12. Gear 74 and bar 12 are rotatable with respect to shaft 14. A right splined coupling 10 rotationally couples bar 12 and gear 74 to shaft 14 by means of external splines near the rear of bar 12 and external splines on the rear of shaft 14. The number of spline teeth on the rear of bar 12 and the number of spline teeth on the rear of shaft 14 differ by a count of one. The external splines on the rear of shaft 14 are made a coarser pitch than the external splines on the rear of bar 12. This increases the minor internal spline diameter on the front of coupling 10 so there is no installation interference between the front internal splines on coupling 10 and the external splines at the rear of bar 12. This enables coupling 10 to be installed after bar 12 has been installed in shaft 14. A right torsion bar ball bearing 8 mounts on a rear journal on bar 12 and is supported by a bore to the rear of housing 3. Bearing 8 radially supports the rear portion of bar 12 and shaft 14. A right countershaft rear plug 6 is located in a counterbore in housing 3 immediately to the rear of bearing 8. A right countershaft rear retaining ring 4 is installed in the rear of housing 3 immediately to the rear of plug 6. Axial movement of plug 6, bearing 8, coupling 10 and bar 12 is constrained in the rearward direction by ring 4. Forward axial movement of plug 6 is constrained by housing 3. Forward axial movement of bearing 8, coupling 10 and bar 12 is constrained by shaft 14.

Said left countershaft assembly is rotatably mounted in the left side of case 26 by means of bores in the front and rear walls of case 26, which support bearings 77 and 23, respectively. Bearing 55 is supported by a bore in the inner wall in case 26, which partially encircles bearing 55. Axial movement of said left countershaft assembly is constrained by ring 25, which is in turn axially constrained in the rearward direction by housing 3 and in the forward direction by case 26. Counterbores in housing 3 receive bearing 23 and ring 25. A left front countershaft plug 79 is located in a counterbore in the front of case 26. Rearward axial movement of gear 75 and bearing 77 is constrained by shaft 15. Rearward axial movement of plug 79 is constrained by case 26. Forward axial movement of gear 75, bearing 77 and plug 79 is constrained by said rear face of said external member.

Shaft 15, being of tubular construction, encircles a left torsion bar 13. The front end of bar 13, having external splines, engages internal splines in gear 75 and is radially supported by gear 75. The bore of shaft 15 supports bar 13 at raised journals located near the middle and near the rear end of bar 13. Gear 75 and bar 13 are rotatable with respect to shaft 15. A left splined coupling 11 rotationally couples bar 13 and gear 75 to shaft 15 by means of external splines near the rear of bar 13 and external splines on the rear of shaft 15. The number of spline teeth on the rear of bar 13 and the number of spline teeth on the rear of shaft 15 differ by a count of one. The external splines on the rear of shaft 15 are made a coarser pitch than the external splines on the rear of bar 13. This increases the minor internal spline diameter on the front of coupling 11 so there is no installation interference between the front internal splines on coupling 1I and the external splines at the rear of bar 13. This enables coupling 11 to be installed after bar 13 has been installed in shaft 15. A left torsion bar ball bearing 9 mounts on a rear journal on bar 13 and is supported by a bore to the rear of housing 3. Bearing 9 radially supports the rear portion of bar 13 and shaft 15. A left countershaft rear plug 7 is located in a counterbore in housing 3 immediately to the rear of bearing 9. A left countershaft rear retaining ring 5 is installed in the rear of housing 3 immediately to the rear of plug 7. Rearward axial movement of plug 7, bearing 9, coupling 11 and bar 13 is constrained by ring 5. Forward axial movement of plug 7 is constrained by housing 3. Forward axial movement of bearing 9, coupling 11 and bar 13 is constrained by shaft 15.

Countershaft gears 29, 41, 43 and 63 which mount on countershaft 14, and countershaft gears 30, 42, 44 and 62 which mount on countershaft 15 by means of external splines on said countershafts 14 and 15 are manufactured so that there is a specific angular relationship between the centerline of at least one marked gear tooth and the centerline of at least one marked internal spline on each countershaft gear 29, 30, 41, 42, 43, 44, 62 and 63. These markings are used to rotationally index each countershaft gear 29, 30, 41, 42, 43, 44, 62 and 63 on associated countershaft 14 or 15 to aid in transmission assembly without gear mesh interference. In conjunction with or in place of said spline markings, asymmetric splines may be used to advantage to permit each countershaft gear 29, 30, 41, 42, 43, 44, 62 and 63 to assemble on associated countershaft 14 or 15 in only one possible rotational position. The countershaft gear tooth marking aligns with corresponding marking on mainshaft gear teeth to aid in transmission assembly without gear mesh interference. Other means of gear and shaft marking may be used aid and simplify correct transmission assembly. The means described in this paragraph are by example and are not to be considered as limiting the scope of the invention.

A limited amount of rotational spline lash is employed between each countershaft gear 29, 30, 41, 42, 43, 44, 62 and 63 and associated countershaft 14 or 15 to aid in transmission assembly and to ensure a free-running transmission. This rotational spline lash is of a magnitude sufficient to accommodate the sum of all timing errors within the assembled transmission due to inevitable parts manufacturing tolerances without encountering gear mesh interference. This rotational spline lash is also of a magnitude sufficient to ensure that each countershaft gear 29, 30, 41, 42, 43, 44, 62 and 63 which is not presently transmitting drive torque will not interfere with the gear tooth loading of each countershaft gear 29, 30, 41, 42, 43, 44, 62 and 63 which is presently transmitting drive torque.

In contrast to countershaft gears 29, 30, 41, 42, 43, 44, 62 and 63, gears 74 and 75 do not have any timing relationship between external gear teeth and internal splines and consequently do not have any gear or spline markings. Bars 12 and 13 do not have any timing relationship between the splines at opposite ends of each bar. In contrast to the mainshaft gears 32, 37, 47 and 59, gear 73 has no timing marks.

Gears 74 and 75 are rotationally timed to the left and right countershaft assemblies, respectively, after the mainshaft assembly, input shaft assembly and the left and right countershaft assemblies are installed in case 26. Timing gears 74 and 75 to said countershaft assemblies is accomplished by selecting either bar 12 or 13 to install first. Assuming bar 12 is selected, the front end of bar 12 is inserted into the bore at the rear of shaft 14 until the splines at the front of bar 12 fully engage the splines on gear 74 and bar 12 fully seats on the rear of shaft 14. The forward spline on coupling 10 is passed over the splines near the rear of bar 12. Coupling 10 is rotated until the rear splines on coupling 10 align with the splines on bar 12. The rear splines on coupling 10 engage the splines on bar 12 and coupling 10 is moved further forward until the forward splines on coupling 10 contact the rear splines on shaft 14. Coupling 10 is rotated until the forward splines on coupling 10 align with the rear splines on shaft 14. The front splines on coupling 10 engage the rear splines on shaft 14 and coupling 10 is moved further forward until coupling 10 fully seats against the rear face of shaft 14.

The front end of bar 13 is inserted into the bore at the rear of shaft 15 until the splines at the front of bar 13 fully engage the splines on gear 75 and bar 13 fully seats on the rear of shaft 15. The forward spline on coupling 11 is passed over the splines near the rear of bar 13. Coupling 11 is rotated until the rear splines on coupling 11 align with the splines on bar 13. Coupling 11 is moved further forward until the forward splines on coupling 11 contact the rear splines on shaft 15. If the forward splines on coupling 11 do not align with the splines at the rear of shaft 15, coupling 11 is moved rearward until the splines at the rear of coupling 11 disengage the splines near the rear of bar 13. Coupling 11 is rotated one spline tooth count clockwise or counterclockwise and coupling 11 is moved forward until the forward splines on coupling 11 contact the splines at the rear of shaft 15. The process is repeated in the previous two sentences, rotating coupling 11 one spline tooth count in the same direction each time until the forward splines on coupling 11 align with the splines at the rear of shaft 15. Then, coupling 11 is moved further forward until coupling 11 seats on the rear of shaft 15. This completes the rotational timing of gears 74 and 75 to shafts 14 and 15, respectively.

As noted previously, the spline tooth count at the rear of shafts 14 and 15 differ by a count of one with the spline tooth count near the rear of bar 12 and 13. This difference results in a vernier adjustment to facilitate timing gears 74 and 75 to shafts 14 and 15, respectively. By way of example, but not by way of limitation, if shafts 14 and 15 have a 43 tooth spline count and bars 12 and 13 have a 44 tooth spline count, the resulting vernier adjustment would allow 0.19 degree increments in the rotational timing of gears 74 and 75 to shafts 14 and 15, respectively. Sufficient spline lash is provided between the several splined connections between gear 74 and shaft 14 and between gear 75 and shaft 15 to ensure that there is at least one rotational position of coupling 11 which allows coupling 11 to fully engage the splines near the end of bar 13 and at the end of shaft 15 without interference. It can be seen that greater spline tooth counts on bars 12 and 13 and on shafts 14 and 15 cause this vernier adjustment to have progressively smaller rotational timing increments. Reasonable increases in said spline tooth counts can be used to advantage to reduce the total spline lash required to ensure that there is at least one rotational position of coupling 11 which allows coupling 11 to fully engage the splines near the end of bar 13 and at the end of shaft 15 without interference. Regardless of spline tooth count, however, the spline tooth count at the rear of shafts 14 and 15 differ by a count of one with the spline tooth count near the rear of bar 12 and 13.

Various accepted means are well known and used by those practiced in the art of multiple countershaft transmissions to provide means for reverse gear operation. Two reverse gear embodiments will be described here but it will be understood that other reverse gear embodiments may be used for convenience which will work within the scope of this invention; thus, the reverse gear embodiments described herein are not to be considered as limiting the scope of this invention.

The first said reverse gear embodiment relates to applications whereby substantially less input torque is applied for reverse gear operation than forward gear operation. By way of example, such applications include transmissions used in certain automotive drag racing vehicles. In such an application, one reverse idler shaft assembly is sufficient to reliably transmit the greatly reduced input torque applied to the transmission during reverse gear operation. Consequently, in such applications, torque for reverse gear operation is transmitted through only one of the multiple countershafts used for forward gear operation.

In the first said reverse gear embodiment (not shown), said reverse idler shaft assembly would consist of a driven reverse idler gear, a driving reverse idler gear, a shaft connecting said reverse idler gears, any convenient means to rotatively fix said idler gears to said shaft and means to support said reverse idler shaft assembly for rotative movement only about a fixed axis of rotation. Said axis of rotation of said reverse idler shaft assembly would be parallel to, but offset from, the rotational axis of said mainshaft assembly, the rotational axis of said input shaft assembly and the rotational axis of the left or right countershaft assemblies.

Said driven reverse idler gear would be positioned to be in constant mesh with and axially aligned with either gear 62 or 63, depending on convenience. Said driving reverse idler gear would be positioned axially rearward of gear teeth on the outer periphery of slider 69 when slider 69 is in the position illustrated. Further, said driving reverse idler gear would be positioned so that when slider 69 is moved rearward, the gear teeth on the periphery of slider 69 would fully mesh with the gear teeth on said driving reverse idler gear. To aid in the alignment and engagement of said gear teeth on the outer periphery of slider 69 to the gear teeth on said driving reverse idler gear, the rearward edge of the gear teeth on slider 69 are beveled and the forward edge of the gear teeth on said driving reverse idler gear are beveled.

The position of said reverse idler gear assembly axis of rotation is further constrained by the requirement that the driven and driving reverse idler gears have a common axis of rotation.

Since reverse drive torque would pass through only one said reverse idler shaft assembly, there would be no need to time said reverse driven idler gear to it's associated countershaft gear and there would be no need to have a specific timing relationship between said driven reverse idler gear and said driving reverse idler gear.

The second said reverse gear embodiment relates to applications in which a substantially greater percentage of engine torque is applied during reverse gear operation as compared to the first said reverse gear embodiment. By way of example, such applications include transmissions used in tractor-trailer trucks. In such applications, torque for reverse gear operation would be directed through the multiple countershafts used for forward gear operation.

In the second said reverse gear embodiment (not shown), the appearance of the outer periphery of slider 69 would change to that of slider 35 such that there would be no gear teeth on the outer periphery of slider 69. A reverse mainshaft gear would be added to mainshaft 1 between ring 66 and hub 68. Said reverse mainshaft gear would contain a bearing for rotation of said reverse mainshaft gear with respect to mainshaft 1. Said reverse mainshaft gear and bearing assembly would be radially supported by mainshaft 1. Axial movement of said reverse mainshaft gear and bearing assembly would be constrained in the rearward direction preferably by ring 66 and in the forward direction preferably by hub 68. Said reverse mainshaft gear would have external, integral clutch teeth in addition to external gear teeth. Said clutch teeth would be at the forward end of said reverse mainshaft gear. Said clutch teeth on said reverse mainshaft gear would be configured to mesh with the internal splines on slider 69 when slider 69 is moved rearward from the illustrated position.

Axially aligned to said reverse mainshaft gear would be left and right reverse countershaft gears of equal gear tooth count and of identical construction features and means of axial retention to gears 41, 42, 43, 44, 62 and 63 described previously. However, said reverse mainshaft gear would not mesh directly with said left and right reverse countershaft gears. Instead, a left reverse idler gear would be interposed between said left reverse countershaft gear and said reverse mainshaft gear. Said left reverse idler gear would be axially aligned with and in continual mesh with said left reverse countershaft gear and said reverse mainshaft gear. Said left reverse idler gear would be located on a fixed axis of rotation which would allow said left reverse idler gear to fully mesh with said left reverse countershaft gear and said reverse mainshaft gear. Any convenient means would be used to constrain axial movement of said left reverse idler gear and to support said left reverse idler gear for rotational movement.

Accordingly, a right reverse idler gear would be interposed between said right reverse countershaft gear and said reverse mainshaft gear. Said right reverse idler gear would be axially aligned with and in continual mesh with said right reverse countershaft gear and said reverse mainshaft gear. Said right reverse idler gear would be located on a fixed axis of rotation which would allow said right reverse idler gear to fully mesh with said right reverse countershaft gear and said reverse mainshaft gear. Any convenient means would be used to constrain axial movement of said right reverse idler gear and to support said right reverse idler gear for rotational movement. Said left and right reverse idler gears would have the same gear tooth count.

Permanent gear tooth markings would be present on said reverse mainshaft gear and said left and right reverse idler gears. This would be in addition to permanent gear tooth and spline markings present on all countershaft gears splined directly to shafts 14 and 15. Such markings would be used to time said reverse idler gears to their associated countershaft gears to aid in transmission assembly without gear mesh interference. Other means of gear marking of said left and right reverse idler gears and said reverse mainshaft gear may be used to aid and simplify correct transmission assembly. The means described in this paragraph are by example and are not to be considered as limiting the scope of the invention.

A slip yoke (not shown) having internal splines slidably engages external splines at the rear of mainshaft 1 to rotationally couple the mainshaft 1 to the remainder of the vehicle drive train. Said slip yoke, being radially supported by a mainshaft bushing 16, radially supports the rearward end of mainshaft 1.

A mainshaft seal 2 installs in the rear of housing 3 and seals against a journal on said slip yoke. An input shaft seal 83 installs in the retainer 85 and seals against a journal on shaft 86. In addition, other seals, gaskets and sealants are used for lubricant retention.

2. Operation—FIG. 1

Drive torque applied to shaft 86 is transmitted to gear 73. Gear 73 transmits drive torque to gears 74 and 75. Gears 74 and 75 transmit drive torque to bars 12 and 13 respectively. Bars 12 and 13 transmit drive torque to couplings 10 and 11 respectively. Couplings 10 and 11 transmit drive torque to shafts 14 and 15 respectively. If by manipulation of the shift mechanism slider 35 is moved rearward such that the internal splines on slider 3 5 engage the external clutch teeth on gear 32, drive torque is transmitted by shaft 14 and 15 to gears 30 and 29 respectively. From gears 30 and 29, drive torque is transmitted to gear 32. From gear 32, drive torque is transmitted to slider 35. From slider 35, drive torque is transmitted to hub 34. From hub 34, drive torque is transmitted to mainshaft 1. Mainshaft 1 is connected to the remainder of the vehicle drivetrain to provide driving torque thereto. Shaft 86 and mainshaft 1 then rotate in the same direction, although at relative rates of rotation determined by the gear ratios within the above noted gears presently transmitting drive torque.

Inevitable part manufacturing tolerances in the assembled transmission combine to result in gears 29 and 30 being slightly imperfectly timed relative to each other. The following assumes the case where said tolerances combine to cause gear 30 to be slightly advanced relative to gear 29 when gears 29 and 30 are in the driving mode and after all gear and spline lash has been taken up between shaft 86 and gear 30. In this case, gear 30 makes initial drive contact with gear 32. At that instant, bar 12 begins transmitting drive torque and gear 30 begins transmitting drive torque to gear 32. The drive torque being transmitted through bar 12 and gear 30 at that instant are relatively small compared to the rated torque capacity of bar 12 and gear 30. In response, bar 12, being torsionally resilient, begins angularly deflecting about the axis of rotation of bar 12. This angular deflection of bar 12 causes the rotational speed of gear 30 to be less than the rotational speed of gear 75. This rotational speed difference causes the gear and spline lash to be taken up between gear 73 and gear 29. When the drive lash is taken up between gear 29 and gear 32, gear 29 begins transmitting drive torque to gear 32. Bar 13, also being torsionally resilient, begins angularly deflecting about the axis of rotation of bar 13. Bars 12 and 13, being identically constructed, both angularly deflect an increasing amount at equal rates as the drive torques transmitted by bars 12 and 13 increase. Consequently, the drive torque transmitted by bar 12 would exceed the drive torque transmitted by bar 13 by a small amount relative to the rated torque capacity of each countershaft assembly. This relatively small torque differential would essentially remain constant as the transmission transitions from a state of low drive torque through a state of maximum drive torque. A state of approximate equilibrium is reached whereby the drive torques transmitted by gears 29 and 30 to gear 32 are balanced, save for the aforesaid relatively small torque differential.

It can be seen that bars 12 and 13, being torsionally resilient, when used in conjunction with appropriate levels of spline lash at appropriate locations, and when used with the previously discussed vernier rotational timing adjustment can result in a more compliant transmission design, one more tolerant of gear timing imprecisions without creating substantial imbalances in the drive torque applied to each countershaft. This is accomplished without the need to cause the driven mainshaft gears and the mainshaft to float, thus avoiding the disadvantages outlined previously and incumbent to such designs.

At least one manufacturer of multiple countershaft transmissions having the conventional floating mainshaft gear design maintains a maximum countershaft gear-to-countershaft angular positioning error of ±0.001 inch at the gear pitch line. On a 6.8 inch pitch diameter gear such as may be found in heavy duty truck transmissions of this type, this represents an angular positioning error of only ±0.017 degree.

In contrast, it can be seen that the torsionally resilient bars 12 and 13 of this invention can be designed to deflect such that 0.017 degree could represent substantially less than one percent of the total angular deflection of each said bar from a condition of zero transmitted torque to a condition of maximum rated torque. It can be seen that if gear 30 is 0.017 degree advanced relative to gear 29, the resulting torque differential between bars 12 and 13 could be substantially less than one percent after gears 29 and 30 make drive contact with gear 32. Viewed differently, the reader can see an opportunity to substantially reduce the required counter-gear timing precision while keeping countershaft torque differentials within acceptable levels.

Although the foregoing allows a transmission more tolerant of gear timing imprecisions, part manufacturing tolerances in the assembled transmission which combine to cause a left or a right countershaft gear to make initial contact with a driven mainshaft gear should be held to reasonable levels. This further ensures that drive torques transmitted by each countershaft more nearly approach equality. In addition, this keeps the amount of spline lash necessary for proper transmission function at a reduced level.

It can be concluded from the illustration that the descriptions of drive torque transmission to mainshaft gears 32, 37, 47 and 59 are essentially identical, save for item numbers differing and transmission gear ratios varying. Consequently, it is not considered necessary to present separate description of drive torque transmission to mainshaft gears 37, 47 and 59.

If by manipulation of the shift mechanism slider 69 is moved forward such that the internal splines on slider 69 engage the external clutch teeth on gear 73, drive torque is transmitted from shaft 86 to gear 73 and from gear 73 to slider 69. Slider 69 transmits drive torque to hub 68 and hub 68 transmits drive torque to mainshaft 1. Shaft 86 and mainshaft 1 are then rotating in the same direction at the same rotational speed.

As noted in the description section, two reverse gear embodiments were described. The first embodiment was that of reverse drive torque being transmitted through only one countershaft. The operational description of the first embodiment will be first. The operational description of the second embodiment will follow.

Drive torque applied to shaft 86 is transmitted to gear 73 and from gear 73 to gear 74. Drive torque is transmitted from gear 74 to bar 12 and from bar 12 to coupling 10. Drive torque is transferred from coupling 10 to shaft 14 and from shaft 14 to gear 62. Drive torque is transmitted from gear 62 to a reverse idler gear assembly (not shown). Said reverse idler assembly consists of a reverse driven idler gear, a reverse idler driving gear and a rotatable reverse idler shaft having a fixed axis of rotation. Gear 62 transmits drive torque to said reverse driven idler gear and from said reverse driven idler gear to said reverse idler shaft. Said reverse idler shaft transmits drive torque to said reverse driving idler gear. If by manipulation of the shift mechanism slider 69 is moved rearward such that said reverse driving idler gear meshes with gear teeth on the outer periphery of slider 69, drive torque is transmitted from said reverse driving idler gear to slider 69. Drive torque is transmitted from slider 69 to hub 68 and from hub 68 to mainshaft 1. Mainshaft 1 will be rotating in a direction opposite to the rotation of shaft 86 and at relative rates of rotation determined by the gear ratios within the above noted gears presently transmitting drive torque.

The second reverse gear embodiment (not shown) directs drive torque through each of the multiple countershafts used for forward gear operation to effect reverse gear operation. Drive torque is applied to shaft 86 and from shaft 86 drive torque is transmitted to gear 73. Drive torque is transmitted from gear 73 to gears 74 and 75. Drive torque is transferred from gears 74 and 75 to bars 12 and 13 respectively and from bars 12 and 13 to couplings 10 and 11 respectively. Drive torque is transmitted from couplings 10 and 11 to shafts 14 and 15 respectively.

In this embodiment, as noted in the description section but included here in abbreviated form for convenience, the appearance of the outer periphery of slider 69 would change to that of slider 35 such that there would be no gear teeth on the outer periphery of slider 69. A reverse mainshaft gear would be added to mainshaft 1 between ring 66 and hub 68, said reverse mainshaft gear being rotatably mounted to mainshaft 1. Said reverse mainshaft gear would have external clutch teeth located at the forward end of said gear. Said clutch teeth would be configured to mesh with the internal splines on slider 69 when slider 69 is moved rearward from the illustrated position.

Axially aligned to said reverse mainshaft gear would be left and right reverse countershaft gears of equal gear tooth count and identical construction features to gears 41, 42, 43, 44, 62 and 63. However, said reverse mainshaft gear would not mesh directly with said left and right reverse countershaft gears. Instead, a left reverse idler gear would be interposed between said left reverse countershaft gear and said reverse mainshaft gear. Said left reverse idler gear would be axially aligned with and in continual mesh with said left reverse countershaft gear and said reverse mainshaft gear.

Accordingly, a right reverse idler gear would be interposed between said right reverse countershaft gear and said reverse mainshaft gear. Said right reverse idler gear would be axially aligned with and in continual mesh with said right reverse countershaft gear and said reverse mainshaft gear.

To resume the description of the drive torque path through the geartrain, drive torque is transmitted from shafts 14 and 15 to said right and left reverse countershaft gears respectively. Drive torque is transmitted from said right and left reverse countershaft gears to said right and left reverse idler gears respectively. Drive torque is transmitted from said right and left reverse idler gears to said reverse mainshaft gear. If by manipulation of the shift mechanism slider 69 is moved rearward such that the internal splines on slider 69 meshes with the clutch teeth on said reverse mainshaft gear, drive torque is transmitted from said reverse mainshaft gear to slider 69 and from slider 69 to hub 68. Drive torque is transmitted from hub 68 to mainshaft 1. Mainshaft 1 will be rotating in a direction opposite to the rotation of shaft 86 and at relative rates of rotation determined by the gear ratios within the above noted gears presently transmitting drive torque. In this embodiment, the same mechanism is used to transmit drive torque in an identical fashion from shaft 86 to said left and right reverse countershaft gears as was described to transmit drive torque from shaft 86 to gears 29 and 30. Consequently, the reverse gear embodiment described here enjoys the same benefit of the angular deflection of bars 12 and 13 to accommodate the inevitable gear timing imperfections in the reverse geartrain.

Although transmission operation has been described thus far in terms of a driving torque being applied to input shaft 86, the transmission components specific to this invention works equally well when a driving torque is being applied to mainshaft 1, such as is the case, for example, when the vehicle in which the transmission is installed is decelerating by use of engine braking.

3. Conclusion, Ramifications and Scope of Invention

Thus the reader will see that the transmission of the invention is an attractive alternative to existing multiple countershaft transmissions in the areas of manufacturing, use and repair.

it permits significant reductions in the rotational positioning accuracy of gears within countergear assemblies;

it eliminates the need for secondary countershaft gear-to-spline timing operations, since these gears would now be producible on machinery which automatically machines the gear teeth timed to the internal splines well within the reduced rotational positioning accuracy limits;

it eliminates welding as part of the countergear assembly manufacturing process, thus eliminating the possibility of distortion of countergear assemblies and weakening of heat-treated gear teeth due to welding heat;

it permits easy service replacement of individual countershaft gears as opposed to the current practice of having to replace an entire countershaft assembly consisting of a multitude of gears because of one bad gear;

it permits the usage of splined countershaft gears and splined countershafts having sufficient spline clearance to permit hand assembly of countershaft gears onto countershafts as opposed to one current practice of using heavy press fits to secure countershaft gears on countershafts;

it allows a significant reduction in gear shifting effort, since gear shifting would no longer include the added effort required to align the mainshaft with the driven mainshaft gear;

it allows the mainshaft gears to remain coaxial with the mainshaft at all times, thus eliminating sources of friction and wear due to relative sliding motion between the driven mainshaft gear-to-mainshaft coupling elements as these elements rotate, it allows the mainshaft gears to remain coaxial with the mainshaft at all times, thus allowing the usage of synchromesh clutches for gear engagement;

by allowing the mainshaft gears to remain coaxial with the mainshaft at all times, this also results in uniform contact between the driven mainshaft gears and the mainshaft members used to limit the axial movement of the driven mainshaft gears on the mainshaft, thus reducing contact stress; this can especially be beneficial in helically-geared transmissions which by nature generate significant axial gear thrust forces;

it allows the mainshaft to be non-floating, thus preventing vibration due to floating mainshaft nutation; this can also serve to reduce gear shifting effort, since gear shifting would no longer include the effort required to overcome these vibrational forces to align the mainshaft with the driven mainshaft gear;

it provides for radial support of all mainshaft gears, resulting in pitch line-to-pitch line contact between the mainshaft gears and mating gears; this serves to increase power transmission efficiency and reduce gear noise, it provides for a transmission which can achieve the above advantages while maintaining a substantially balanced distribution of torque on each countershaft.

While my above description contains many specificities, these should not be construed as limitations on the scope of the invention, but rather exemplifications of preferred embodiments thereof Many other variations are possible. For example, assuming two countershafts, the rotational axes of the countershafts do not have to lie in a horizontal plane, but can be oriented in any convenient plane so long as they are parallel to and equidistant from the mainshaft axis of rotation. Assuming two or more countershafts, the rotational axes of the countershafts are preferably spaced symmetrically about the rotational axis of the mainshaft. However, for considerations such as fit within a vehicle, the rotational axes of the countershafts may be spaced asymmetrically about the rotational axis of the mainshaft, so long as they are parallel to and equidistant from the mainshaft axis of rotation.

The housing 3 is illustrated as separate from case 26 and the case 26 is illustrated as having separate halves. However, several permutations are possible, two of which are described: for example, case 26 being one piece with a separate housing 3; or, for example, integral case and housing halves, split along the same plane as the viewing plane in the illustration.

The illustrated transmission has five forward speeds and one reverse speed. However, the invention allows for more or fewer than five speeds and for more than one reverse speed. The particular speed ratios herein represent any desired gearing and ratio arrangement and accordingly need no detailing. The chosen speed ratios can be such to cause the mainshaft 1 to rotate at a reduced speed, the same speed or at a greater speed relative to shaft 86. In addition, although the illustration depicts a transmission having first, second, third, fourth and fifth speed gears arranged from the rear of case 26 toward the front of case 26 in that order, this order can change subject to convenience.

The shifting means to move sliders 35, 51 and 69 forward or rearward for alternate, but only alternate engagement to mainshaft gears, reverse gears or to the input gear is not illustrated, but are varied and well known by those practiced in the art.

The spline tooth counts at the front and rear ends of couplings 10 and 11 may be greater or lesser than the example cited in the specification. However, the difference in spline tooth count between the front and rear of couplings 10 and 11 is a count of one.

Coupling 10 and coupling 11 offer a preferred means of indexably coupling bar 12 to shaft 14 and bar 13 to shaft 15, respectively. Other rotationally adjustable coupling means may be used.

In the specification, references are made to certain types of bearings used. These references (such as ball bearing, roller bearing, bushing) are for example only and do not limit the type of bearings used at any location.

In the specification, the input shaft 86 and the input gear 73 are separate parts. It may be preferred to make shaft 86 and gear 73 of one-piece construction.

In the drawing, bearings 54 and 55 are partially encircled by bores in case 26. It may be preferred, room permitting, for case 26 bores to completely encircle bearings 54 and 55.

The transmission can have an auxiliary section, containing auxiliary gear ratios to cause the auxiliary section output shaft to rotate at a greater or lesser speed than mainshaft 1. In this case, mainshaft 1, bars 12 and 13, and shafts 14 and 15 would likely terminate more closely to the rear of case 26, providing room for said auxiliary section. Said auxiliary section would likely occupy the area housing 3 occupies in the drawing.

Independent of the use of a transmission auxiliary section, it may be preferred to terminate mainshaft 1 more closely to the rear of case 26. Separately, it may be preferred to terminate bars 12 and 13 and shafts 14 and 15 more closely to case 26. If bars 12 and 13 and shaft 14 and 15 are terminated sufficiently close to bearings 22 and 23, it would be possible to eliminate bearings 8 and 9, provided alternate means are provided to keep couplings 10 and 11 and bars 12 and 13 seated on shafts 14 and 15, respectively.

As a gear train permutation, drive torque may be applied directly and equally to the forward ends of bars 12 and 13 in which case gear 73 may be omitted so long as the forward end of bars 12 and 13 remain rotationally interlocked through other means, such as the drive torque source.

Power takeoff devices may be used by gearing said devices to gears 74 or 75. Such an arrangement will not cause an unbalance of drive torque directed to the driven mainshaft gear which is clutched to mainshaft 1. Power takeoff devices which require a small percentage of torque to drive relative to the rated torque capacity of each countershaft may be geared to gears 29, 30, 41, 42, 43, 44, 62 or 63 without negatively affecting the operation or reliability of the transmission.

Lubrication of gears, bearings and any other significantly loaded contact surfaces within the transmission are not detailed; however, lubrication means may include lubrication by splash, spray or pressurized delivery or other means familiar to and used by those skilled in the art.

Accordingly, the scope of the invention should be determined not by the embodiments illustrated, but by the appended claims and their legal equivalents.

What is claimed is:

1. A change-gear system comprising:
    (a) a housing;
    (b) at least two spaced countershafts having parallel axes and mounted for rotation within said housing, said countershafts each having a fixed axis of rotation with respect to said housing;
    (c) a plurality of groups of gears on said countershafts, each group being comprised of countershaft gears of identical gear tooth count;
    (d) rotationally interlocked means for providing input power for each of said countershafts;
    (e) torsionally resilient means to transmit rotational energy from said rotationally interlocked means to each of said countershafts;
    (f) a driven gear driveable from each group of said countershaft gears;
    (g) output means having a fixed axis of rotation with respect to said housing;
    (h) each said driven gear rotatably mounted on said output means;
    (i) gear tooth backlash being provided within assembled said change-gear system;
    (j) means for selectively clutching said output means to one of said driven gears at a time for selectively establishing a driving relationship from said countershafts through one group of said countershaft gears at a time, thence to and through said driven gear driveable from said one group for effecting driving of said output means.

2. The change-gear system of claim 1 wherein said gear tooth backlash is provided by:
    (a) sufficient spline backlash between said countershaft gears and said countershafts to ensure gear tooth backlash within said change-gear system in spite of inevitable gear timing imprecisions within assembled said change-gear system;
    (b) sufficient spline backlash between said countershaft gears and said countershafts so that said countershaft gears which are not presently transmitting drive torque do not impede substantially equal load-sharing of said countershaft gears which are presently transmitting drive torque, in spite of inevitable gear timing imprecisions within assembled said change-gear system.

3. The change-gear system of claim 1 further including means to adjustably rotate and lock at least all but one of said countershafts relative to said rotationally interlocked means, subject to angular deflection of said torsionally resilient means during torque transmission.

4. The change-gear system defined in claim 3 wherein said change-gear system includes:

(a) a splined connection between one end of each said torsionally resilient means and said rotationally interlocked means;

(b) a male shaft spline at or near the opposite end of each said torsionally resilient means;

(c) a male shaft spline at or near one end of each said countershaft;

(d) said male shaft spline on each said torsionally resilient means differs by a spline tooth count of one with said male shaft spline on each said countershaft;

(e) a female splined coupling to driveably connect each pairing of said torsionally resilient means and said countershafts;

(f) said coupling having appropriate spline tooth counts at each end to mesh with and driveably connect said each pairing;

(g) said coupling being indexably rotatable and lockable such that the resulting fractional increments of adjustment of one rotation of each said countershaft relative to each said torsionally resilient means is substantially the inverse of the product of the spline tooth count of each said pairing, thus describing a vernier timing adjustment;

(h) said female splined coupling is arranged so that the spline having the larger pitch diameter is of sufficiently coarser diametral pitch relative to the spline having the smaller pitch diameter such that said larger pitch diameter spline on said coupling can pass over said smaller pitch diameter spline of said pair without interference, thus allowing said coupling to mesh with said pairing;

(i) sufficient spline backlash exists in the multiple splined connections between said rotationally interlocked means and said countershafts which, when used in combination with said vernier timing adjustment provides at least one rotational position whereby each said coupling will mesh with and lock said pairing for torque transmission, regardless of the rotational position of each countershaft.

5. A change-gear system comprising:

(a) a housing;

(b) at least two spaced countershafts having parallel axes and mounted for rotation within said housing, said countershafts each having a fixed axis of rotation with respect to said housing;

(c) a plurality of countershaft ratio gears on said countershafts, the gears on one countershaft being associated with oppositely arranged gears on each other countershaft to define gear groups;

(d) rotationally interlocked means for providing input power for each of said countershafts;

(e) torsionally resilient means to transmit rotational energy from said rotationally interlocked means to each of said countershafts;

(f) a driven gear driveable from each group of said countershaft gears;

(g) output means having a fixed axis of rotation with respect to said housing;

(h) each said driven gear rotatably mounted on said output means;

(i) gear tooth backlash being provided within assembled said change-gear system;

(j) means for selectively clutching said output means to one of said driven gears at a time for selectively establishing a driving relationship from said countershafts through one group of said countershaft gears at a time, thence to and through said driven gear driveable from said one group for effecting driving of said output means.

6. The change-gear system of claim 5 wherein said gear tooth backlash is provided by:

(a) sufficient spline backlash between said countershaft gears and said countershafts to ensure gear tooth backlash within said change-gear system in spite of inevitable gear timing imprecisions within assembled said change-gear system;

(b) sufficient spline backlash between said countershaft gears and said countershafts so that said countershaft gears which are not presently transmitting drive torque do not impede substantially equal load-sharing of said countershaft gears which are presently transmitting drive torque, in spite of inevitable gear timing imprecisions within assembled said change-gear system.

7. The change-gear system of claim 5 further including means to adjustably rotate and lock at least all but one of said countershafts relative to said rotationally interlocked means, subject to angular deflection of said torsionally resilient means during torque transmission.

8. The change-gear system defined in claim 7 wherein said change-gear system includes:

(a) a splined connection between one end of each said torsionally resilient means and said rotationally interlocked means;

(b) a male shaft spline at or near the opposite end of each said torsionally resilient means;

(c) a male shaft spline at or near one end of each said countershaft;

(d) said male shaft spline on each said torsionally resilient means differs by a spline tooth count of one with said male shaft spline on each said countershaft, (e) a female splined coupling to driveably connect each pairing of said torsionally resilient means and said countershafts;

(f) said coupling having appropriate spline tooth counts at each end to mesh with and driveably connect said each pairing;

(g) said coupling being indexably rotatable and lockable such that the resulting fractional increments of adjustment of one rotation of each said countershaft relative to each said torsionally resilient means is substantially the inverse of the product of the spline tooth count of each said pairing, thus describing a vernier timing adjustment;

(h) said female splined coupling is arranged so that the spline having the larger pitch diameter is of sufficiently coarser diametral pitch relative to the spline having the smaller pitch diameter such that said larger pitch diameter spline on said coupling can pass over said smaller pitch diameter spline of said pair without interference, thus allowing said coupling to mesh with said pairing;

(i) sufficient spline backlash exists in the multiple splined connections between said rotationally interlocked means and said countershafts which, when used in combination with said vernier timing adjustment provides at least one rotational position whereby each said coupling will mesh with and lock said pairing for torque transmission, regardless of the rotational position of each countershaft.

9. A change-gear system comprising:
(a) a housing;
(b) at least two spaced countershafts having parallel axes, being mounted and supported for rotation within said housing, said countershafts each having a fixed axis of rotation with respect to said housing;
(c) said countershafts being torsionally resilient;
(d) a plurality of groups of gears on said countershafts, each group being comprised of countershaft gears of identical gear tooth count;
(e) means for providing input power to each of said countershafts;
(f) a driven gear driveable from each group of said countershaft gears;
(g) output means having a fixed axis of rotation with respect to said housing;
(h) each said driven gear rotatably mounted on said output means;
(i) gear tooth backlash being provided within assembled said change-gear system;
(j) means for selectively clutching said output means to one of said driven gears at a time for selectively establishing a driving relationship from said countershafts through one group of said countershaft gears at a time, thence to and through said driven gear driveable from said one group for effecting driving of said output means.

10. The change-gear system of claim 9 wherein said gear tooth backlash is provided by:
(a) sufficient spline backlash between said countershaft gears and said countershafts to ensure gear tooth backlash within said change-gear system in spite of inevitable gear timing imprecisions within assembled said change-gear system;
(b) sufficient spline backlash between said countershaft gears and said countershafts so that said countershaft gears which are not presently transmitting drive torque do not impede substantially equal load-sharing of said countershaft gears which are presently transmitting drive torque, in spite of inevitable gear timing imprecisions within assembled said change-gear system.

* * * * *